(12) United States Patent
Quijano

(10) Patent No.: US 8,388,042 B2
(45) Date of Patent: Mar. 5, 2013

(54) INTEGRATED DOOR AND SHELVING SYSTEM

(75) Inventor: Jonathan Joseph Quijano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 97 days.

(21) Appl. No.: 12/947,217

(22) Filed: Nov. 16, 2010

(65) Prior Publication Data

US 2012/0119536 A1 May 17, 2012

(51) Int. Cl.
*B60R 7/06* (2006.01)

(52) U.S. Cl. .................. 296/37.8; 296/37.12; 296/24.34

(58) Field of Classification Search ............... 296/24.34, 296/37.1, 37.8, 37.12, 37.13
See application file for complete search history.

(56) References Cited

U.S. PATENT DOCUMENTS

| | | | |
|---|---|---|---|
| 5,050,922 A | 9/1991 | Falcoff | |
| 5,104,208 A | 4/1992 | Gesing | |
| 5,931,527 A | 8/1999 | D'Onofrio et al. | |
| 6,871,922 B1 | 3/2005 | Pustilnikov | |
| 7,192,072 B2 * | 3/2007 | Schmidt et al. | 296/37.12 |
| 7,261,355 B2 * | 8/2007 | Stack et al. | 296/37.12 |
| 7,264,291 B2 * | 9/2007 | Radu et al. | 296/24.34 |
| 7,290,818 B2 * | 11/2007 | Haba et al. | 296/37.12 |
| 7,703,623 B2 * | 4/2010 | Katagiri et al. | 220/264 |
| 8,127,962 B2 * | 3/2012 | Kogami | 220/348 |
| 8,172,297 B2 * | 5/2012 | Rhee | 296/37.12 |
| 2011/0156418 A1 * | 6/2011 | Thorsell et al. | 296/24.34 |

FOREIGN PATENT DOCUMENTS

| | | | | |
|---|---|---|---|---|
| JP | 4-85145 | * | 3/1992 | 296/37.12 |
| JP | 4-90939 | * | 3/1992 | 296/37.12 |

* cited by examiner

*Primary Examiner* — Glenn Dayoan
*Assistant Examiner* — Gregory Blankenship
(74) *Attorney, Agent, or Firm* — Gifford, Krass, Sprinkle, Anderson & Citkowski, P.C.

(57) ABSTRACT

The present invention provides for an integrated door and shelving system for a storage compartment located on a vehicle instrument panel. The storage compartment includes at least one door rotatably mounted to the opening of the storage compartment and rotatable about a first axis. The storage compartment includes a side wall, a back wall, and a lower wall. When the door is in a substantially open position, the door is generally parallel to the lower wall and generally perpendicular to the back wall. When the door is rotated to a fully closed position, the door is generally perpendicular to the lower wall and generally parallel to the back wall. When fully opened, the door is used as a shelf to store a cell phone, iPod, PDA, etc.

12 Claims, 1 Drawing Sheet

INTEGRATED DOOR AND SHELVING SYSTEM

FIELD OF THE INVENTION

This invention relates generally to vehicle storage systems. In particular, this invention relates to a system allowing for storage and shelving within an instrument panel assembly of a vehicle.

BACKGROUND OF THE INVENTION

Increased storage compartments and storage space within a vehicle is increasingly becoming a highly desirable vehicle quality. Vehicle users are utilizing more accessories than ever including cell phones, iPods, MP3 players, etc. Storage for said items is highly valuable real estate within the vehicle. Storage space having the ability to hide its contents is also highly desirable. Storage space easily accessible to a vehicle driver is also highly desirable. Accordingly, a storage compartment allowing for simplified storage and access of vehicle user accessories allowing said accessories to be stowed away and covered is highly desirable.

SUMMARY OF THE INVENTION

The present invention provides for an integrated door and shelving system for a storage compartment located on a vehicle instrument panel. The storage compartment includes at least one door rotatably mounted to the opening of the storage compartment and rotatable about a first axis. The storage compartment includes a side wall, a back wall, and a lower wall. When the door is in a substantially open position, the door is generally parallel to the lower wall and generally perpendicular to the back wall. When the door is rotated to a fully closed position, the door is generally perpendicular to the lower wall and generally parallel to the back wall. When fully opened, the door is used as a shelf to store a cell phone, iPod, FDA, etc.

DETAILED DESCRIPTION OF THE PREFERRED EMBODIMENTS

The present invention provides a storage compartment having at least one rotatable door operable to act as a door and also as a shelf for storing personal accessories. The storage compartment is located within the instrument panel of a vehicle. The doors rotate from a closed position concealing objects inside the storage box to an open position allowing a user to access items within the storage box and to also use the doors as a shelving unit.

Figure 1:
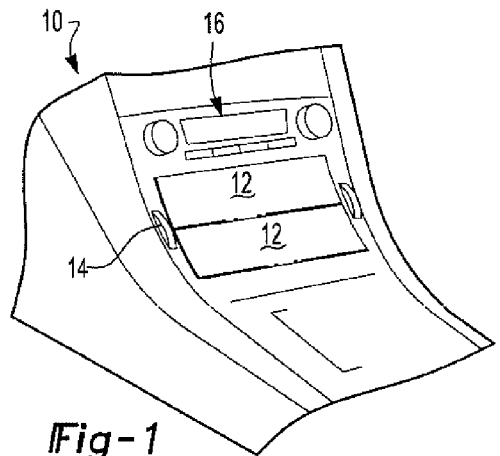
FIG. 1 is a perspective view of an instrument panel having a storage compartment and rotating doors wherein the rotating doors are in a fully closed position.

An instrument panel console 10 is provided having a panel or door 12 rotatable about a first axis by means of the knob 14. In this embodiment, the doors 12 covering the storage compartment 20 are located below the radio 16. FIG. 1 depicts the doors 12 in a fully closed position. The planar door 12 is generally perpendicular to the lower wall 48 and generally parallel to the back wall 46 when the door 12 is in a fully closed position.

Figure 2:
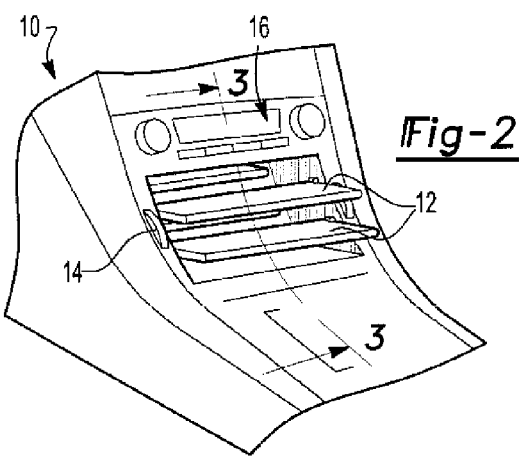
FIG. 2 is a perspective view of an instrument panel having rotating doors wherein the rotating doors are in an open position.

FIG. 2 depicts the door 12 in a fully open position allowing for a user to place personal accessories, such as an iPod, cell phone, PDA, etc., on the door 12. In this fully open position, the door 12 is generally parallel to the lower wall 46 of the storage compartment 30 and generally perpendicular to the back wall 46 of the storage compartment 30.

Figure 5:
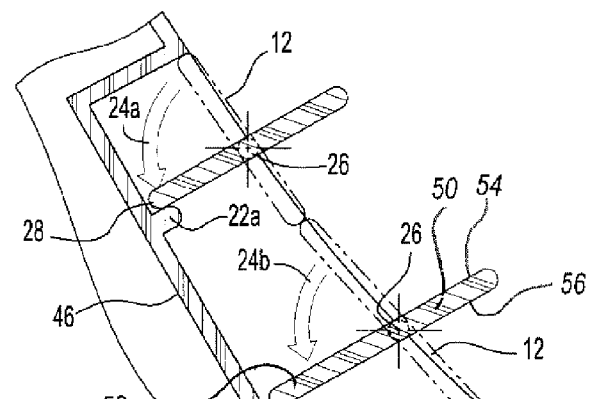
FIG. 5 is a cross-sectional view of an alternative embodiment of the doors in an open position.

As shown in FIG. 5, the door 12 moves from a closed position to an open position as shown by the movement arrows 24a, 24b. In this embodiment, stoppers 22a, 22b located on the back wall 46 prevent further movement of the doors 12 about the first axis 26. The doors 12 pivot about the first axis 26 until the first end 28 of the door 12 hits the stopper 22a, 22b. The stoppers 22a, 22b prevent further movement of the doors 12 about the first axis 26 and provide for a stable shelf for personal accessories. The door 12 further includes a first portion 50 and a second portion 52. When in the open position, the second portion 52 extends into the storage compartment 30. The door 12 further includes a first surface 54 and a second surface 56. In the present embodiment, the second surface 56 engages with the stoppers 22a, 22b.

Figure 3:
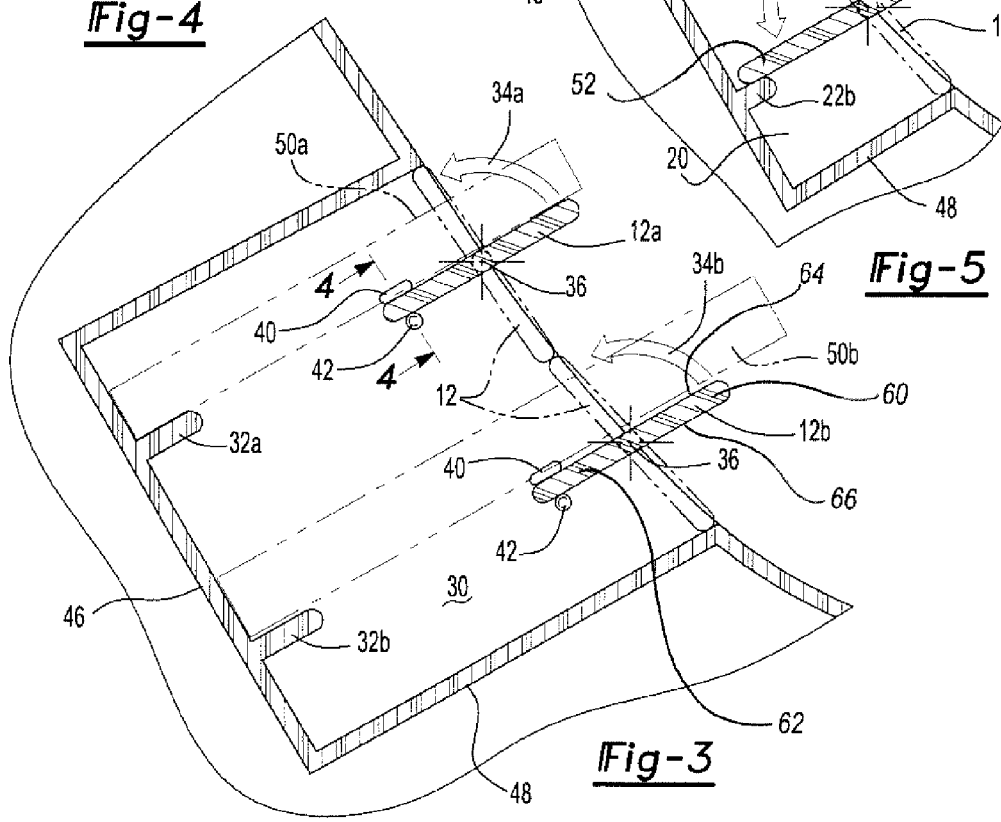
FIG. 3 is a cross-sectional view along section 3-3 of FIG. 2 showing the doors in a fully open position.

FIG. 3 depicts the doors 12 moving from a fully open position to a fully closed position as shown by movement arrows 34a, 34b. In the fully open position, as shown by the doors 12a, 12b, personal accessories 50a, 50b are placed within the storage compartment 30 and use rear projections 32a, 32b and doors 12a, 12b as a shelf. Smaller personal accessories may be placed fully within the storage compartment 30 and the doors 12 may be fully closed as shown by movement arrows 34a, 34b to conceal the contents of the storage compartment 30. The door 12 further includes a first portion 60 and a second portion 62. When in the open position, the second portion 62 extends into the storage compartment 30. The door 12 further includes a first surface 64 and a second surface 66. In the present embodiment, both the first surface 54 and the second surface 66 engage with the stopping members 40, 42.

Figure 4:
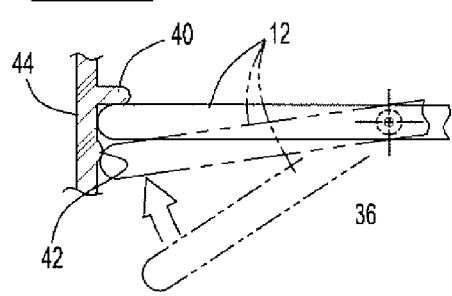
FIG. 4 is a cross-sectional view along section 4-4 of FIG. 3.

As shown in FIG. 3 and FIG. 4, an alternative embodiment for preventing movement of the door 12 is shown. First protrusion 40 acts as a stopper to prevent further movement of the door 12 as it is pivoting about the first axis 36. Protrusion 40 fully stops movement of the door 12. Protrusion 42 is operable to prevent downward rotation of the door 12 about the first axis 36. Protrusion 42 located on the side wall 44 is small enough to allow the door 12 to travel over the protrusion 42 and to be fully stopped by the protrusion 40. Use of the protrusion 40 and the protrusion 42 prevents unwanted rotation of the door 12 about the first axis 36 when the door is fully open. Use of the protrusion 40 and the small protrusion 42 allows the user to more easily place accessories 50a, 50b within the storage compartment 30.

The elements such as the door 12, the lower wall 48, the back wall 46, the protrusions 32a, 32b, the protrusion 40, the small protrusion 42, and the side wall 44 are comprised of any resilient material such as a plastic, metal, polymer, polymer like, plastic like, or other suitable material.

The depth of the storage compartment 30, and therefore length of the lower wall 48, may vary providing for differences in storage capacities within the instrument panel console 10. The dimensions and shape of the storage compartment 30 may vary according to the requirements of the instrument panel design specifications and according to typical passenger storage requirements.

A knob 14 may be used to easily rotate the door 12 about the first axis 36. The door 12 may be rotated about the first axis 36 (or the first axis 26) by means of the user pushing on the door 12 to rotate the door 12. The first axis 36 is a pin extending through the door 12 either entirely through the door 12 or only partially. In an alternative embodiment, the first axis 36 may also be a simple protrusion wherein the door 12 rotates about the protrusion on either side of the door 12. Other means of rotation such as handles or levers may also be used to rotate the door 12 about the first axis 36.

The invention is not restricted to the illustrative examples and embodiments described above. The embodiments are not intended as limitations on the scope of the invention. Methods, apparatus, compositions, and the like described herein are exemplary and are not intended as limitations on the scope of the invention. Changes therein and other uses will occur to those skilled in the art. The scope of the invention is described by the scope of the claims.

I claim:

1. An integrated door, storage and shelving assembly for use within a vehicle, the integrated door, storage and shelving assembly comprising:
    a compartment having an opening, the compartment having at least one generally vertical wall;
    at least one panel having a horizontal pivot axis, the panel having a first surface and a second surface, the panel further having a first portion and a second portion, the horizontal pivot axis extending through the panel, the horizontal pivot axis positioned between the first portion and the second portion, the panel rotatable about the horizontal pivot axis from a generally horizontal open position to a closed position; and
    a stopping member provided on the at least one generally vertical wall for positioning and maintaining the panel in the horizontal open position, the stopping member extending outwardly from the generally vertical wall, the stopping member engaging one of the first surface or the second surface of the panel in the horizontal open position, the second portion extending into the compartment when in the horizontal open position.

2. The door, storage and shelving assembly of claim 1, wherein the at least one panel is a plurality of panels.

3. The door, storage and shelving assembly of claim 1, wherein the stopping member is a protrusion.

4. The door, storage and shelving assembly of claim 3, wherein a protrusion is provided on the at least one wall of the storage compartment to prevent further movement of the panel and to complete a full shelf.

5. The door, storage and shelving assembly of claim 4, wherein a second protrusion operable to secure the panel between the first protrusion and the second protrusion to form a shelf.

6. The door, storage and shelving assembly of claim 1, wherein a means for rotation is provided.

7. The door, storage and shelving assembly of claim 6, wherein a knob is provided to rotate the at least one panel.

8. The door, storage and shelving assembly of claim 1, wherein the closed position is a first position defined by the at least one panel rotated so that the at least one panel is generally vertical.

9. The door, storage and shelving assembly of claim 1, wherein the open position is a second position defined by the at least one panel rotated so that the at least one panel is generally horizontal.

10. The door, storage and shelving assembly of claim 1, wherein the at least one wall is planar.

11. The door, storage and shelving assembly of claim 1, wherein the at least one panel rotates about an elongated pin extending though the at least one panel.

12. The door, storage and shelving assembly of claim 1, wherein the panel extends substantially into the compartment.

* * * * *